(12) United States Patent
Yamauchi et al.

(10) Patent No.: US 7,697,560 B2
(45) Date of Patent: Apr. 13, 2010

(54) METHOD OF ASSIGNING RADIO CHANNELS

(75) Inventors: Takahisa Yamauchi, Tokyo (JP); Genya Kotani, Tokyo (JP); Tetsuya Mishuku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1201 days.

(21) Appl. No.: 10/549,749

(22) PCT Filed: Jan. 30, 2004

(86) PCT No.: PCT/JP2004/000926

§ 371 (c)(1),
(2), (4) Date: Sep. 21, 2005

(87) PCT Pub. No.: WO2005/074313

PCT Pub. Date: Aug. 11, 2005

(65) Prior Publication Data

US 2007/0060179 A1    Mar. 15, 2007

(51) Int. Cl.
*H04Q 11/04* (2006.01)

(52) U.S. Cl. .................. 370/444; 370/445; 370/447; 370/448; 370/348; 455/450; 455/451; 455/452.2

(58) Field of Classification Search .............. 370/444, 370/445, 447, 448, 348, 337
See application file for complete search history.

(56) References Cited

U.S. PATENT DOCUMENTS 5,898,927 A    4/1999  Ishii et al.

6,563,806 B1    5/2003  Yano et al.

FOREIGN PATENT DOCUMENTS

| EP | 1 168 868 A1 | 1/2002 |
|---|---|---|
| EP | 1168868 A1 * | 1/2002 |
| JP | 6-209283 A | 7/1994 |
| JP | 6-276138 A | 9/1994 |
| JP | 8-182042 A | 7/1996 |
| JP | 10-84573 A | 3/1998 |
| JP | 10-285644 A | 10/1998 |
| JP | 11-262044 A | 9/1999 |
| JP | 2000-31890 A | 1/2000 |
| JP | 2000-156884 A | 6/2000 |
| JP | 3207135 B2 | 7/2001 |
| JP | 3231904 B2 | 9/2001 |
| JP | 2001-517047 A | 10/2001 |
| JP | 3244153 B2 | 10/2001 |
| JP | 2002-44718 A | 2/2002 |
| WO | WO-99/14967 A1 | 3/1999 |

* cited by examiner

*Primary Examiner*—Charles N. Appiah
*Assistant Examiner*—Randy Peaches
(74) *Attorney, Agent, or Firm*—Birch, Stewart, Kolasch & Birch, LLP

(57) ABSTRACT

A base station assigns a most appropriate carrier from wide frequency bands in response to a re-request for channel establishment received from a mobile station, even if a same slot as a slot last assigned is assigned. Furthermore, a frequency management table is managed in which carriers that form a radio channel and are grouped by a specific number thereof so as to be distributed over wide frequency bands. Priorities used to search groups are individually provided for base stations that form a system. This allows neighboring base stations to distribute carriers over the wide frequency bands.

20 Claims, 15 Drawing Sheets

FIG.3

SLOT #1: FREQUENCY GROUP #1, FREQUENCY GROUP #2, FREQUENCY GROUP #3, FREQUENCY GROUP #4, FREQUENCY GROUP #5, FREQUENCY GROUP #6

SLOT #2: FREQUENCY GROUP #1, #2, #3, #4, #5, #6

SLOT #3: FREQUENCY GROUP #1, #2, #3, #4, #5, #6

SLOT #4: FREQUENCY GROUP #1, #2, #3, #4, #5, #6

FREQUENCY INFORMATION #1, FREQUENCY INFORMATION #2, FREQUENCY INFORMATION #3, ..., FREQUENCY INFORMATION #n-1, FREQUENCY INFORMATION #m

CARRIER #1 | RECEPTION LEVEL

FIG.4

| FREQUENCY GROUP NUMBER | FREQUENCY AS MANAGEMENT TARGET | | | | | | | | | | | |
|---|---|---|---|---|---|---|---|---|---|---|---|---|
| #1 | 1 | 7 | 13 | 19 | 25 | 31 | 37 | 43 | 49 | 55 | 61 | 67 |
| #2 | 2 | 8 | 14 | 20 | 26 | 32 | 38 | 44 | 50 | 56 | 62 | 68 |
| #3 | 3 | 9 | 15 | 21 | 27 | 33 | 39 | 45 | 51 | 57 | 63 | 69 |
| #4 | 4 | 10 | 16 | 22 | 28 | 34 | 40 | 46 | 52 | 58 | 64 | 70 |
| #5 | 5 | 11 | 17 | 23 | 29 | 35 | 41 | 47 | 53 | 59 | 65 | 71 |
| #6 | 6 | 12 | 18 | 24 | 30 | 36 | 42 | 48 | 54 | 60 | 66 | 72 |

FIG.5

| CS-ID [5:3] | PRIORITY OF FREQUENCY GROUP NUMBER | | | | | |
|---|---|---|---|---|---|---|
| 000 | #1 | #2 | #3 | #4 | #5 | #6 |
| 001 | #2 | #3 | #4 | #5 | #6 | #1 |
| 010, 110 | #3 | #4 | #5 | #6 | #1 | #2 |
| 011 | #4 | #5 | #6 | #1 | #2 | #3 |
| 100, 111 | #5 | #6 | #1 | #2 | #3 | #4 |
| 101 | #6 | #1 | #2 | #3 | #4 | #5 |

HIGH ← PRIORITY → LOW

| CARRIER SENSE LEVEL NUMBER | CARRIER SENSE LEVEL VALUE |
|---|---|
| #1 | 10 dBμV |
| #2 | 15 dBμV |
| #3 | 20 dBμV |
| #4 | 25 dBμV |
| #5 | 35 dBμV |

FIG.10

| CARRIER NUMBER | CARRIER#7 | | CARRIER#13 | | CARRIER#1 | | CARRIER#25 | |
|---|---|---|---|---|---|---|---|---|
| RECEIVED LEVEL | 21 dBμV | ① | 2 dBμV | ① | 9 dBμV | ① | 30 dBμV | ① |
| MEASUREMENT TIME | 01:00:34.1 | | 01:00:36.1 | | 01:00:38.1 | | 01:00:40.1 | |

SLOT #1　　SLOT #2　　SLOT #3　　SLOT #4

HIGH ↑ PRIORITY ↓ LOW

FREQUENCY GROUP #1
FREQUENCY GROUP #2
FREQUENCY GROUP #3
FREQUENCY GROUP #4
FREQUENCY GROUP #5
FREQUENCY GROUP #6

METHOD OF ASSIGNING RADIO CHANNELS

TECHNICAL FIELD

The present invention relates to a radio channel assignment method in a radio communication system, and more particularly, to a radio channel assignment method in a radio communication system that employs multicarrier TDMA/TDD (Time Division Multiple Access/Time Division Duplex).

BACKGROUND ART

A conventional radio channel assignment method is explained below.

The conventional radio channel assignment method includes, for example, an autonomous distributed dynamic channel assignment scheme in which each of two or more radio base stations perform channel selection/assignment autonomously without exchanging control information between other radio base stations (see Patent Literature 1).

When there is a call, the conventional autonomous distributed dynamic channel assignment scheme allows a base station or a mobile station to select all of radio channels which are used by a system. Each of base stations cyclically measures received levels of interference at radio channels, channel-by-channel, and enters radio channels, at which the received level of the interference is an allowable value or less in the system, in an idle channel table on a memory of the system in order of detection of the radio channels and by the fixed number thereof.

Furthermore, upon switching of radio channels or upon finishing of communication, each of the base stations sets the order of received-level measurement of interference at a radio channel to the highest order, the radio channel at which no interference is affected during communication and which is released thereafter. Each of the base stations also sets the order of received-level measurement of interference at a radio channel to the lowest order, the radio channel at which interference is affected during communication and which is released thereafter.

When there is a call, the base station refers to the memory of the system and determines whether the communication link quality satisfies the allowable value of the system in the order from the radio channel that is entered in the idle channel table as the highest order. The base station then selects the radio channel initially determined that the quality is satisfied, and uses it for communication.

Patent Literature 1: Japanese Patent No. 3244153, Channel assignment method.

However, in a radio communication system in which the channel assignment method described in the above patent literature is used, the base station refers to the received levels of interference cyclically measured. Therefore, this system does not recognize the received level of interference at the transmission timing. Because of this, if a re-request of radio channel assignment or a radio channel switching request is received from a mobile station, and if switching is instructed by a base station, instead of assigning a carrier that is appropriate at the transmission timing, a carrier near a carrier that is last assigned is generally assigned.

Furthermore, in the radio communication system in which the conventional channel assignment method is used, in neighboring base stations, for example, there is a case where carriers, at which a received level measured value of interference satisfies an allowable value or less in the system, may overlap, and a timing of assigning a radio channel may be close to another timing. In this case, the assigned carriers overlap, which increases the interference between base stations.

The present invention has been achieved to solve at least the conventional problems. It is an object of the present invention to provide a radio channel assignment method capable of assigning an appropriate carrier at a transmission timing, as a radio channel, (capable of reducing probability of assigning a carrier near a carrier that is last assigned), if a re-request of radio channel assignment or a switching request thereof is received from a mobile station or if switching is instructed by a base station.

It is another object of the present invention to provide a radio channel assignment method capable of reducing interference between base stations through distribution of carriers, which can be assigned, over wide frequency bands by a neighboring base station.

DISCLOSURE OF THE INVENTION

According to an aspect of the present invention, a radio channel assignment method of employing a multicarrier TDMA (Time Division Multiple Access) system in which communication is performed using a specific carrier in each transmission/reception slot that is obtained through time division, and of assigning a transmission/reception slot and a carrier, as a radio channel, that satisfy desired quality to each mobile station includes a table managing step of managing a frequency management table that includes groups each having a specific number of carriers that form a radio channel so as to be distributed over wide frequency bands; cyclically measuring a received level of interference at the radio channel using an idle slot; and holding results of measurement in order from a carrier at which the received level is lowest, by each of the groups in slots; a radio-channel-candidate deciding step of deciding a slot to be assigned and candidates for a carrier to be assigned in the slot to be assigned based on the frequency management table, when assignment of a radio channel is requested (re-request is also included); a lowest-received-level-carrier selecting step of performing a carrier sense on the candidates for a carrier to be assigned in the slot to be assigned; and selecting a carrier at which the received level is the lowest, out of the candidates; and a radio channel deciding step of comparing the received level at the carrier selected with a specific threshold value that is used to determine whether interference or interruption occurs; and deciding the carrier selected as a carrier to be assigned when the received level is less than the specific threshold value.

According to the above aspect, even if a base station assigns a slot that was assigned last time in response to a re-request of channel establishment from a mobile station, the base station can assign an appropriate carrier from wide frequency bands (the probability of assigning a carrier near a carrier that is last assigned is reduced). Thus, it is possible to reduce the probability of receiving again a re-request of channel establishment.

BRIEF DESCRIPTION OF THE DRAWINGS

FIG. 3 is a diagram of a structure of frequency management tables;

FIG. 4 is a diagram of a correspondence example between frequency group numbers and carrier numbers (frequencies as management targets);

FIG. 5 is a diagram of a search priority of each frequency group number;

FIG. 10 is a diagram of an overview of the process according to the third embodiment;

BEST MODE FOR CARRYING OUT THE INVENTION

Exemplary embodiments of the radio channel assignment method according to the present invention are explained in detail below with reference to the accompanying drawings. It is noted that the present invention is not limited by the embodiments.

At first, a channel assignment method according to a first embodiment of the present invention is explained below.

Figure 1:
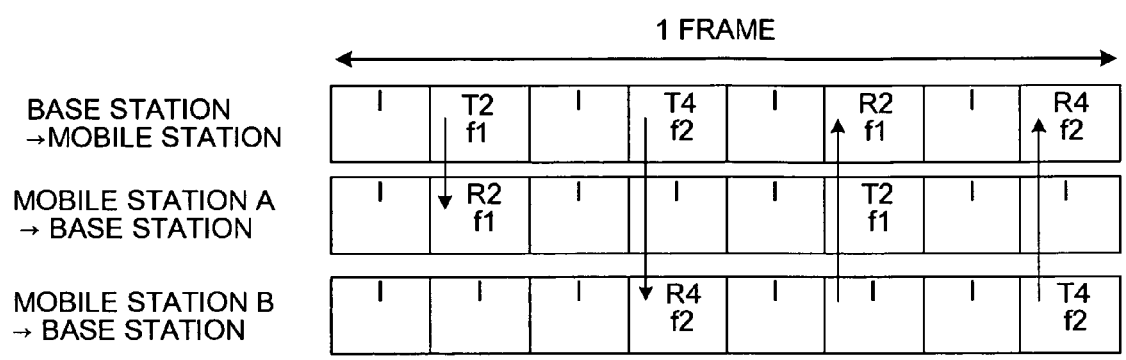
FIG. 1 is a diagram of a slot arrangement in a radio communication system that employs four-channel multicarrier TDMA/TDD.

FIG. 1 is a diagram of a slot arrangement in a radio communication system that employs, for example, four-channel multicarrier TDMA/TDD (Time Division Multiple Access/Time Division Duplex). In the radio channel assignment method according to the first embodiment, as an example, a base station assigns a transmission/reception slot that is divided into four in a time-axis direction, to mobile stations. At this time, a carrier on a frequency axis is assigned to each slot to be assigned, the carrier having an up-link interference level that is measured at a reception timing by a local station and is a value less than a specific threshold value. In other words, FIG. 1 indicates an example in which a mobile station A performs communication with a base station using a carrier f1 in a slot #2 (T2→R2), and a mobile station B performs communication with a base station using a carrier f2 in a slot #4 (T4→R4). It is noted that "I" in FIG. 1 indicates an idle slot.

Figure 2:
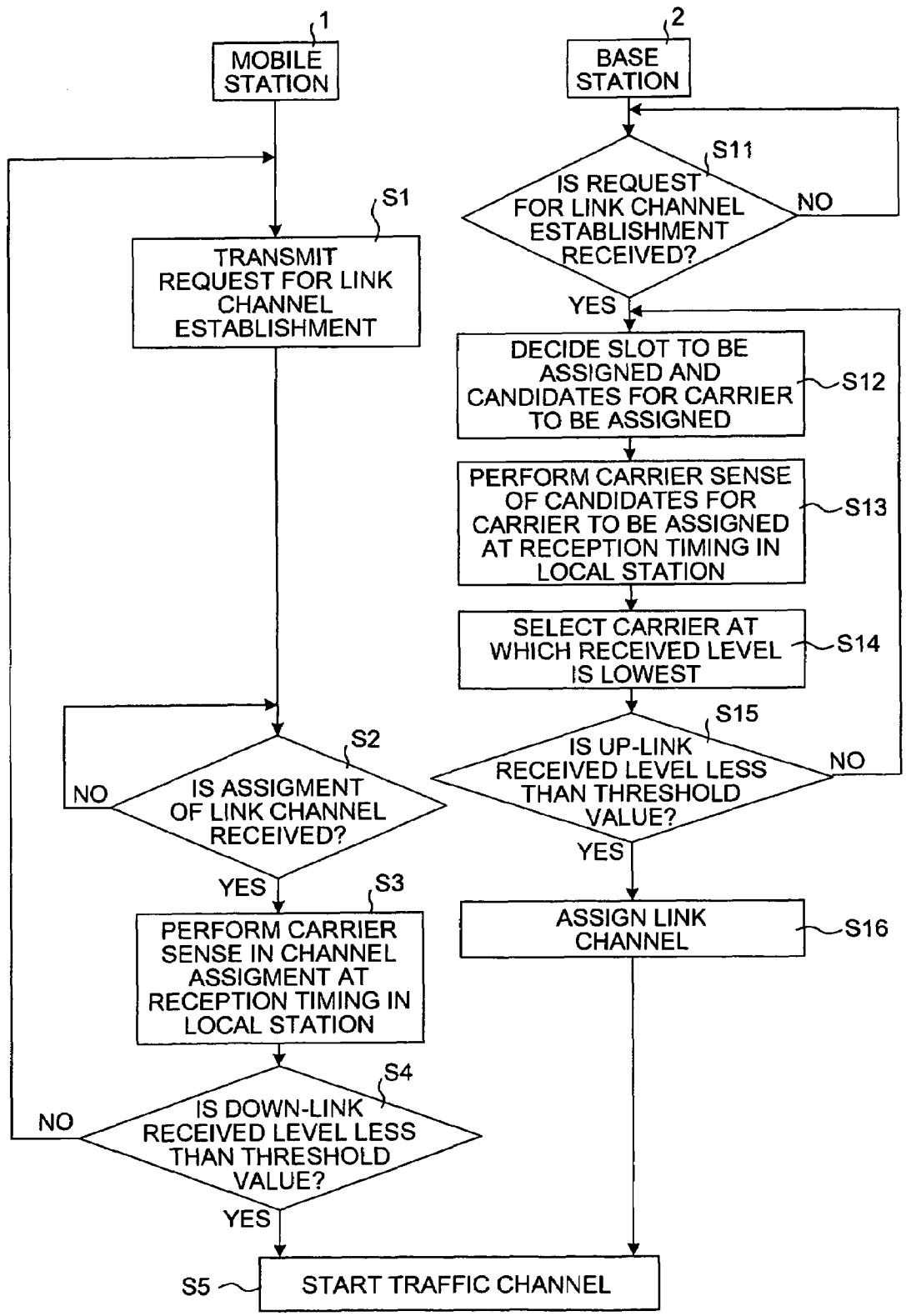
FIG. 2 is a flowchart of a radio channel assignment method according to a first embodiment of the present invention.

The radio channel assignment method according to the present embodiment is explained in detail below with reference to the drawings. FIG. 2 is a flowchart of the radio channel assignment method according to the present embodiment.

More specifically, FIG. 2 is a flowchart of a procedure when a base station 2 assigns a traffic channel according to a request from a mobile station 1.

When receiving a request for link channel establishment from the mobile station 1 through a control channel (step S1, step S11, Yes), the base station 2 refers to the frequency management tables, which are explained later, and decides a slot to be assigned and candidates for a carrier to be assigned in the slot to be assigned (step S12).

The process at step S12 performed with reference to the frequency management tables is explained below.

FIG. 3 is a diagram of a structure of the frequency management tables. The base station 2 manages frequency management tables each of which holds received levels at carriers (frequencies) in each of the four slots. Each of the four frequency management tables is divided into six frequency groups based on a predetermined rule, which is explained later, and each of the six frequency groups consists of m pieces of frequency information each including a carrier and a received level. Each base station uses an idle slot to cyclically measure received levels of interference at a radio channel, and reflects the results of measurement in the frequency management tables. The carriers are aligned in order of their lower received level, i.e., in order of less interference or less interruption for each frequency group.

FIG. 4 is a diagram of a correspondence example between frequency group numbers and carrier numbers (which corresponds to a rule for the grouping). In the first embodiment, when the carrier number is larger, the frequency is higher and an interval between frequencies is constant. Furthermore, 72 carriers are divided into six frequency groups each having 12 carriers, and 12 carriers are assigned to each of the frequency groups at intervals of six carriers (the carriers that form each of the frequency groups are assigned so as to be distributed over the whole frequency bands).

In the first embodiment, a priority indicating an order to perform search (comparison) is given to the six frequency groups. FIG. 5 is a diagram of a search priority of each frequency group number. More specifically, the search priority of each frequency group number in the frequency management table is correlated to three bits (CS-ID [5:3]) ranging between a fifth bit and a third bit from the least significant bit of identification information specific to a base station (CS-ID). For example, search priorities are correlated to a base station of CS-ID [5:3]="000" so that the search priority of a frequency group number #1 is highest and the search priority of a frequency group number #6 is lowest. Further, search priorities are correlated to a base station of CS-ID [5:3]="010" so that the search priority of a frequency group number #3 is highest and the search priority of a frequency group number #2 is lowest.

Therefore, at step S12, the base station 2 searches frequency groups having the highest priority in the slots, and decides a slot to be assigned based on the result of search. And then, the base station 2 searches a frequency group with the highest priority in the slot decided, and decides candidates for a carrier to be assigned based on the result of search.

Next, the base station 2 performs a carrier sense of the candidates for the carrier to be assigned in the slot decided (step S13). And then, the base station 2 selects a carrier having the lowest received level out of the candidates (step S14). The result of performing the carrier sense of the candidates for the carrier to be assigned is reflected in the frequency management table.

Then, the base station 2 compares the received level at the carrier selected with a specific threshold value (a value used to determine whether interference or interruption occurs) that is preset in a local station (step S15). If it is determined that the received level is less than the threshold value, i.e., that there is neither interference nor interruption (step S15, Yes), then, the carrier selected at step S14 is assigned as a traffic channel (proper carrier to be assigned), and then the assignment of a link channel is transmitted to the mobile station 1 that is a request source for link channel establishment (step S16).

As a result of the comparison, if it is determined that the received level is not less than the threshold value, i.e., there is interference or interruption (step S15, No), the process at step S12 and thereafter is performed again. In this case, the base station 2 performs again the process at step S12 on the frequency group number having the highest priority.

On the other hand, when receiving the assignment of the link channel (step S2, Yes), the mobile station 1 performs the carrier sense in the traffic channel assigned, i.e., in a reception slot of the local station (at a reception timing in the mobile station 1) (step S3).

The mobile station 1 compares the received level at a down-link channel with a specific threshold value (a value used to determine whether interference or interruption occurs) that is preset in a local station (step S4). If it is determined that the received level is less than the threshold value (there is neither interference nor interruption) (step S4, Yes), then the mobile station 1 starts communication using the traffic channel (step S5). If it is not less than the threshold value (step S4, No), then the mobile station 1 transmits a re-request for link channel establishment (step S1, step S11, Yes).

When receiving the re-request for link channel establishment, the base station 2 decides the carrier last assigned as a non-candidate over a fixed period, and performs again the process at step S12 on a frequency group number having the highest search priority.

In the first embodiment, as explained above, even if the base station assigns the same slot as the slot last assigned in response to the re-request for link channel establishment received from the mobile station (step S4, No), the base station can assign the most appropriate carrier from the wide frequency bands, i.e., from the carriers distributed, based on the predetermined rule, over the frequency groups. Therefore, the probability of receiving again the re-request for link channel establishment can be certainly reduced. Although the reduction of the re-request for link channel establishment in particular is explained in the first embodiment, the present invention is not limited to this case, and the same effect can be obtained also in the case of channel switching. In other words, the most appropriate carrier can be assigned from the carriers distributed, based on the predetermined rule, over the frequency groups, which makes it possible to surely reduce the probability of receiving again the request for channel switching.

In the first embodiment, when receiving the re-request for link channel establishment, the base station decides the carrier last assigned as a non-candidate over the fixed period. Therefore, a carrier in the slot assigned that is initially decided may not be selected again upon re-request. Thus, even if the same slot is assigned, carriers are distributed within the frequency group, which makes it possible to reduce the possibility of assigning a carrier near the carrier last assigned.

In the first embodiment, the frequency management tables each have carriers that form a radio channel and are grouped so that each specific number of carriers is distributed over the wide frequency bands. Such frequency management tables are managed, and a priority with which each group is individually searched is set for each of the base stations that form the system. Therefore, the neighboring base stations can distribute radio channels (carriers to be assigned) that are respectively assigned (a carrier can be assigned by avoiding any carrier near carriers that have been assigned to neighboring base stations). This allows large reduction in interference between the neighboring base stations.

Although the search priority of an individual frequency group is provided for each base station using identification information specific to each base station in the first embodiment, any method may be used if the search priority can be provided for each base station.

In the first embodiment, by providing the search priorities of the frequency groups for each base station using the identification information specific to the base station, it is possible to largely reduce the time required for separating radio channels, the separation being autonomously performed by each base station in the initial stage of system operation.

A channel assignment method according to a second embodiment of the present invention is explained below.

Figure 6:
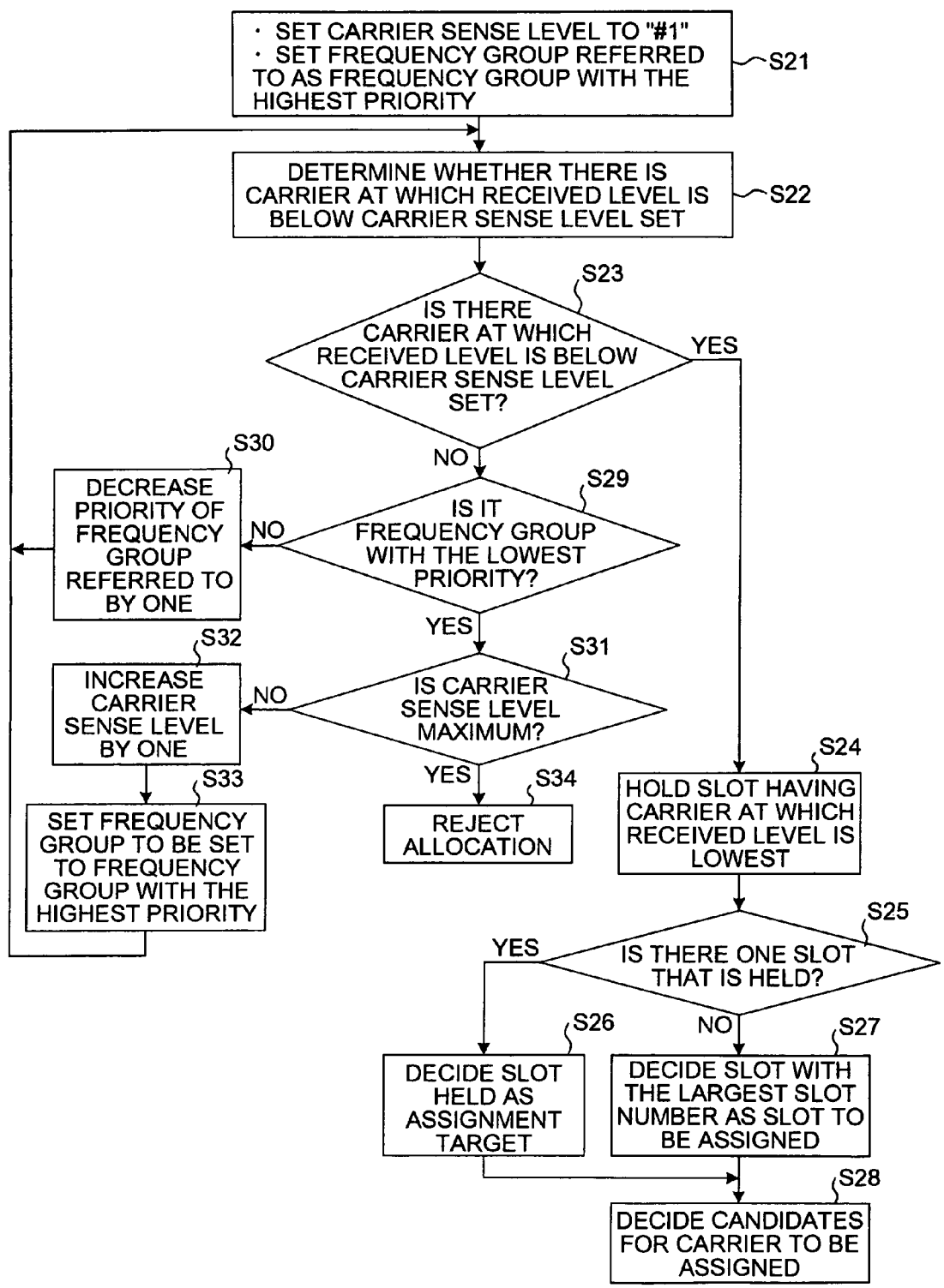
FIG. 6 is a flowchart of a process of deciding a slot to be assigned according to a second embodiment of the present invention.

FIG. 6 is a flowchart of a specific example of the process at step S12 according to the first embodiment as explained above, in other words, the process of deciding a slot to be assigned using the frequency management tables. The detailed process at step S12 is explained below.

At first, when receiving a request for link channel establishment from the mobile station 1, the base station 2 sets a carrier sense level to "#1" that is the lowest level, to decide a slot to be assigned. The carrier sense level is used for comparison with each received level at carriers in the frequency management tables (see FIG. 3). Then, the base station 2 sets a frequency group that is initially referred to of the frequency management tables, as a frequency group with the highest priority (step S21). Here, an initial carrier sense level is set to "#1", but the level may be set to any other level according to a communication environment and the like.

Next, the base station 2 refers to the frequency group set in the above manner and determines, in each idle slot, whether the received level at a head carrier of carriers assigned to the frequency group (a frequency at which the received level of interference is lowest) is below the sense level set (step S22).

If at least one of the received levels at the carriers as targets for comparison in the idle slots is below the carrier sense level that is set in the above manner (step S23, Yes), the base station 2 stores one or more slots having a carrier as a comparison target at which the received level is lowest (step S23). And then, if there is one slot having a carrier as a comparison target at which the received level is the lowest (step S25, Yes), the base station 2 decides the slot as a slot to be assigned (step S26). On the other hand, if there is a plurality of slots each having a carrier as a comparison target at which the received level is the lowest (step S25, No), the base station 2 decides a slot with a largest slot number as a slot to be assigned (step S27).

Figures 7, 8:
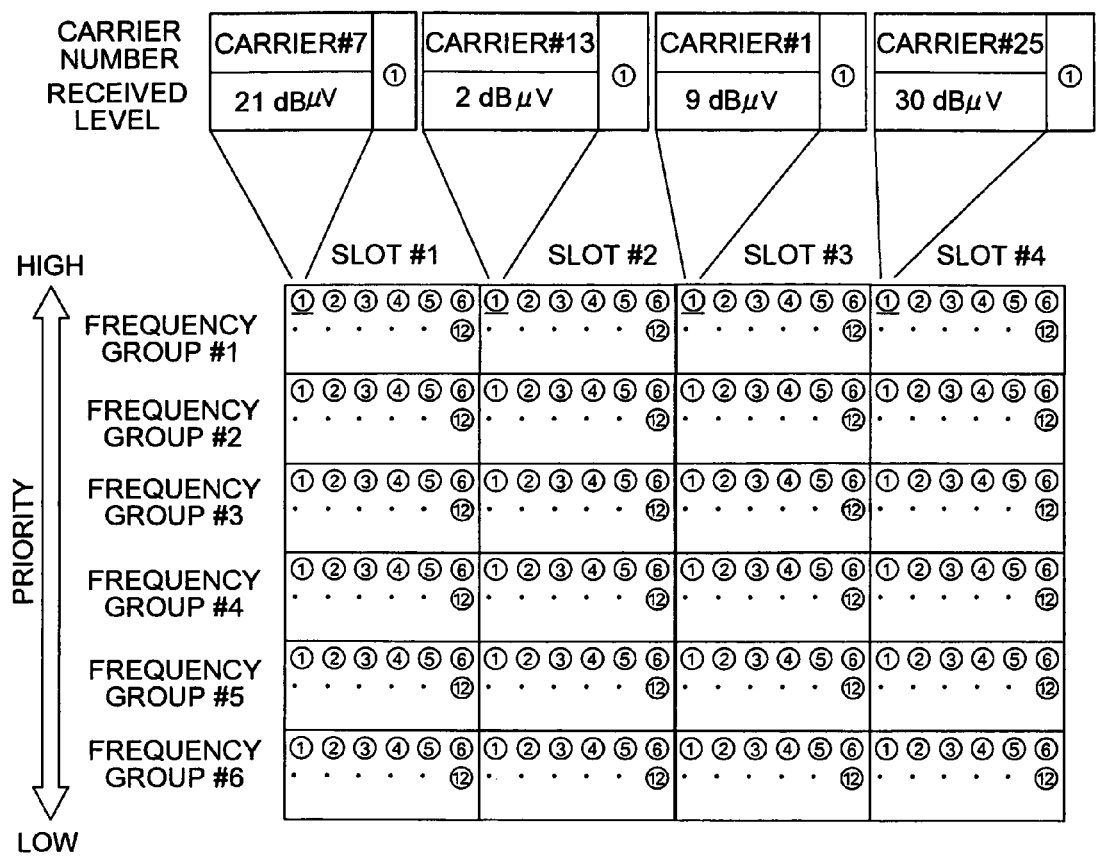
FIG. 7 is a diagram of an overview of the process according to the second embodiment.
FIG. 8 is a diagram of a set range of carrier sense levels.

FIG. 7 is a diagram of an overview of the processes at steps S22, S23, S24, S25, and S27. The base station 2 compares the received level at the head carrier with a set carrier sense level (e.g., 10 dBμV), and selects the slots #2 and #3 as slots each having a head carrier at which the received level is below the set carrier sense level. And then, the base station 2 decides the slot #2 having the head carrier at which the received level is lowest as a slot to be assigned, among the slots each having the head carrier at which the received level is below the set carrier sense level.

At step S27, the slot with the largest slot number is decided as a slot to be assigned; the slot to be assigned can be decided with other methods. For example, a slot with a smallest slot number may be decided as a slot to be assigned, or either one of slots randomly selected may be decided as a slot to be assigned.

The base station 2 refers to carriers in the frequency group set (frequency group with the highest priority) in the slot assigned, and selects the specific number of carriers which is preset, in order from a carrier with a lower received level of interference, as candidates for a carrier to be assigned (step S28). At this time, if the number of candidates for the carrier to be assigned is less than the specific number, then the insufficient number of the candidates may be provided from a frequency group with the next highest priority in the slot assigned.

In the process at step S23, if there is no carrier as a comparison target at which the received level is below the set carrier sense level (step S23, No), and if the frequency group set is not a frequency group with the lowest priority (step S29, No), then the base station 2 sets a frequency group to be set, to a frequency group with a priority lower by one level (step S30), and performs again the process at step S22.

In the process at step S29, if the set frequency group is a frequency group with the lowest priority (step S29, Yes), and if the set carrier sense level is not the maximum (step S31, No), then the base station 2 increases the set carrier sense level (step S32). And then, the base station 2 sets a frequency group to be set to a frequency group with the highest priority (step S33), and performs again the process at step S22. In the second embodiment, as shown in FIG. 8, the carrier sense level can be set to five levels of "#1" to "#5", and different values for the five levels are previously stored, respectively.

In the process at step S31, if the set carrier sense level is the maximum (step S31, Yes), the base station 2 rejects assignment of a carrier to the mobile station 1 (step S34).

In the second embodiment, as explained above, each base station performs the process of deciding a slot to be assigned and candidates for a carrier to be assigned that satisfy desired quality while further increasing the carrier sense level stepwisely in order from a frequency group with higher priority that is set for each base station. This allows more efficient decision of a slot to be assigned in addition to the effect of the first embodiment as explained above.

A channel assignment method according to a third embodiment of the present invention is explained below.

Figure 9:
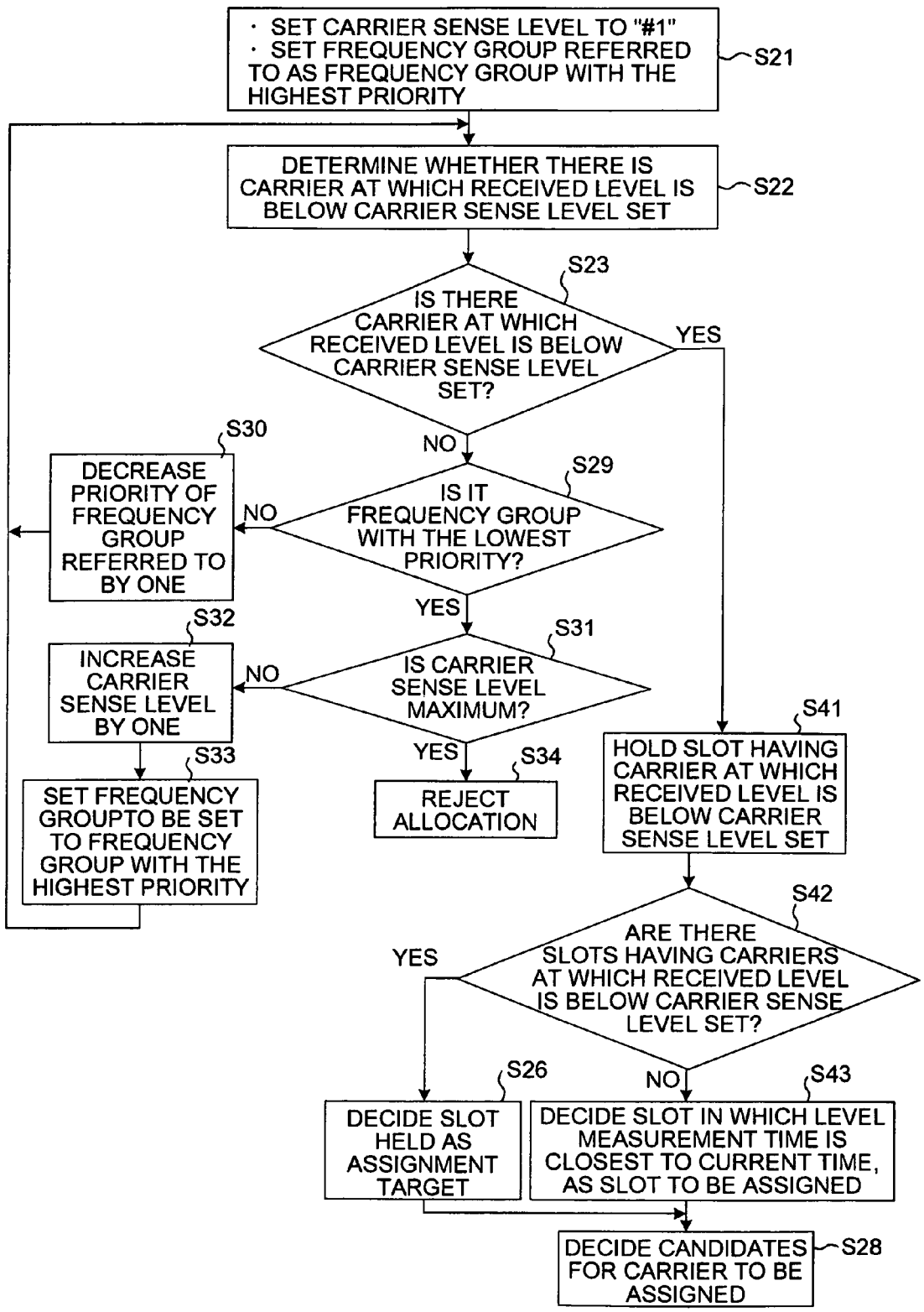
FIG. 9 is a flowchart of a process of deciding a slot to be assigned according to a third embodiment of the present invention.

FIG. 9 is a flowchart of a specific example of the process at step S12 according to the first embodiment, i.e., the process of deciding a slot to be assigned using the frequency management tables. It is noted that processes the same as these of the second embodiment are assigned the same step numbers, and explanation thereof is omitted. Only the processes different from the second embodiment are explained below.

If at least one of the received levels at carriers as comparison targets in idle slots is below the set carrier sense level (step S23, Yes), the base station 2 stores one or more slots each having a carrier as a comparison target at which the received level is below the set carrier sense level (step S41). If there is one slot stored (step S42, No), the base station 2 decides the slot as a slot to be assigned (step S26). If there is a plurality of slots stored (step S42, Yes), the base station 2 decides a slot in which a level measurement time is closest to the current time, as a slot to be assigned (step S43).

FIG. 10 is a diagram of an overview of the processes at steps S22, S23, S41, S42, and S43. The base station 2 compares the received level at the head carrier of the frequency group set with the set carrier sense level (e.g., 10 dBμV), and selects the slots #2 and #3 as slots each having a head carrier at which the received level is below the set carrier sense level. And then, the base station 2 decides the slot #3 in which the level measurement time is closest to the current time, as a slot to be assigned, among the slots each having the head carrier at which the received level is below the set carrier sense level.

In the third embodiment, as explained above, when a slot to be assigned that satisfies desired quality is to be decided, a time at which the received level is measured is taken into account. Thus, it is possible to assign a slot with high reliability in addition to the effects according to the first embodiment and the second embodiment.

A channel assignment method according to a fourth embodiment of the present invention is explained below.

Figure 11:
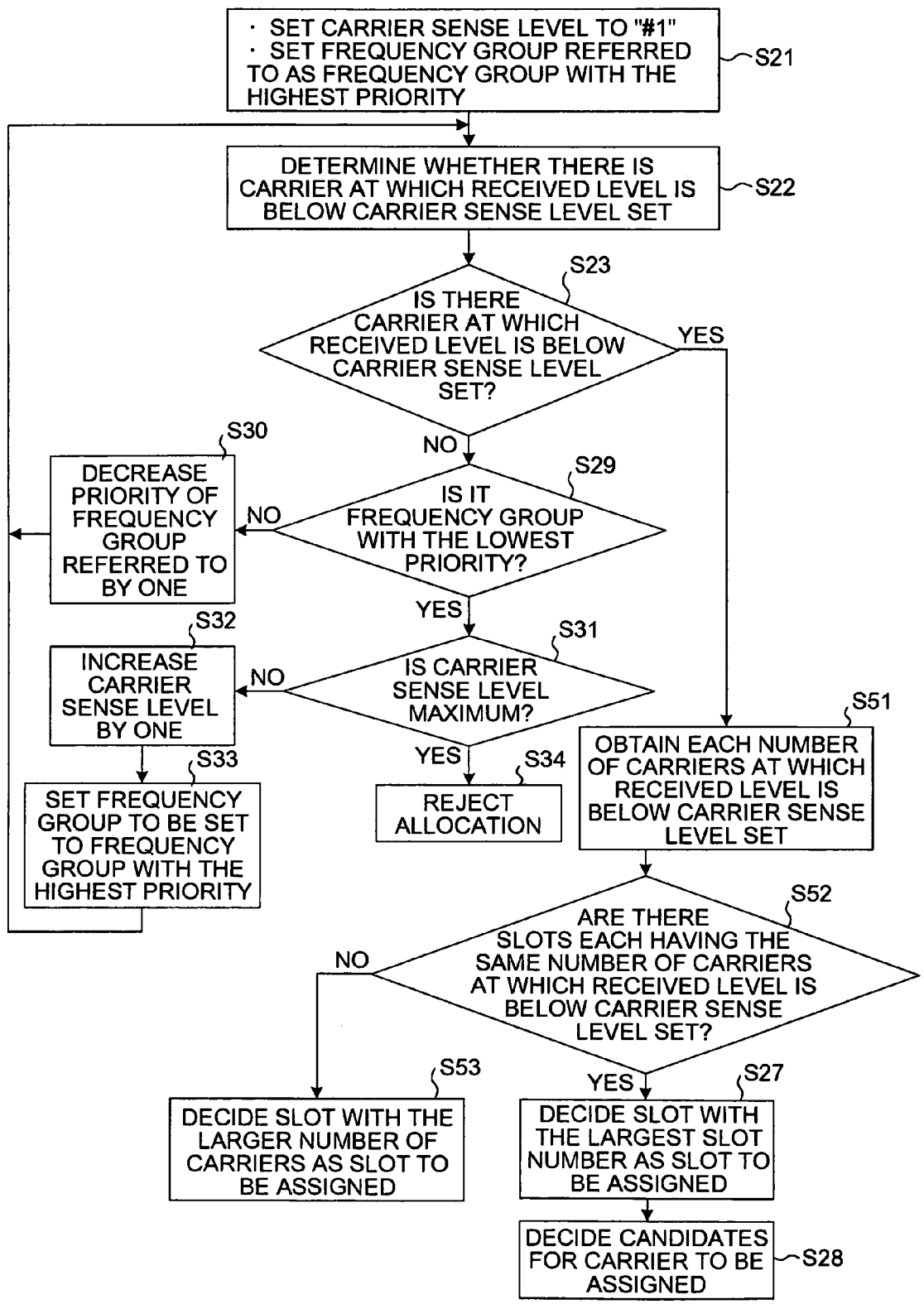
FIG. 11 is a flowchart of a process of deciding a slot to be assigned according to a fourth embodiment of the present invention.

FIG. 11 is a flowchart of a specific example of the process at step S12 according to the first embodiment, i.e., the process of deciding a slot to be assigned using the frequency management tables. It is noted that processes the same as these of the second embodiment or the third embodiment are assigned the same step numbers, and explanation thereof is omitted. Only the processes different from the second embodiment or the third embodiment are explained below.

If at least one of the received levels of carriers as comparison targets in idle slots is below a set carrier sense level (step S23, Yes), the base station 2 obtains the number of carriers at which the received level is below the set carrier sense level in each slot (single or plural) having a carrier as a comparison target at which the received level is below the set carrier sense level, and stores information for the carriers (step S51). If each of the slots has different number of carriers obtained (step S52, No), the base station 2 decides a slot with the largest number of carriers as a slot to be assigned (step S53). If each of the slots has the same number of carriers obtained (step S52, Yes), the base station 2 decides a slot with a largest slot number as a slot to be assigned (step S27).

Figure 12:
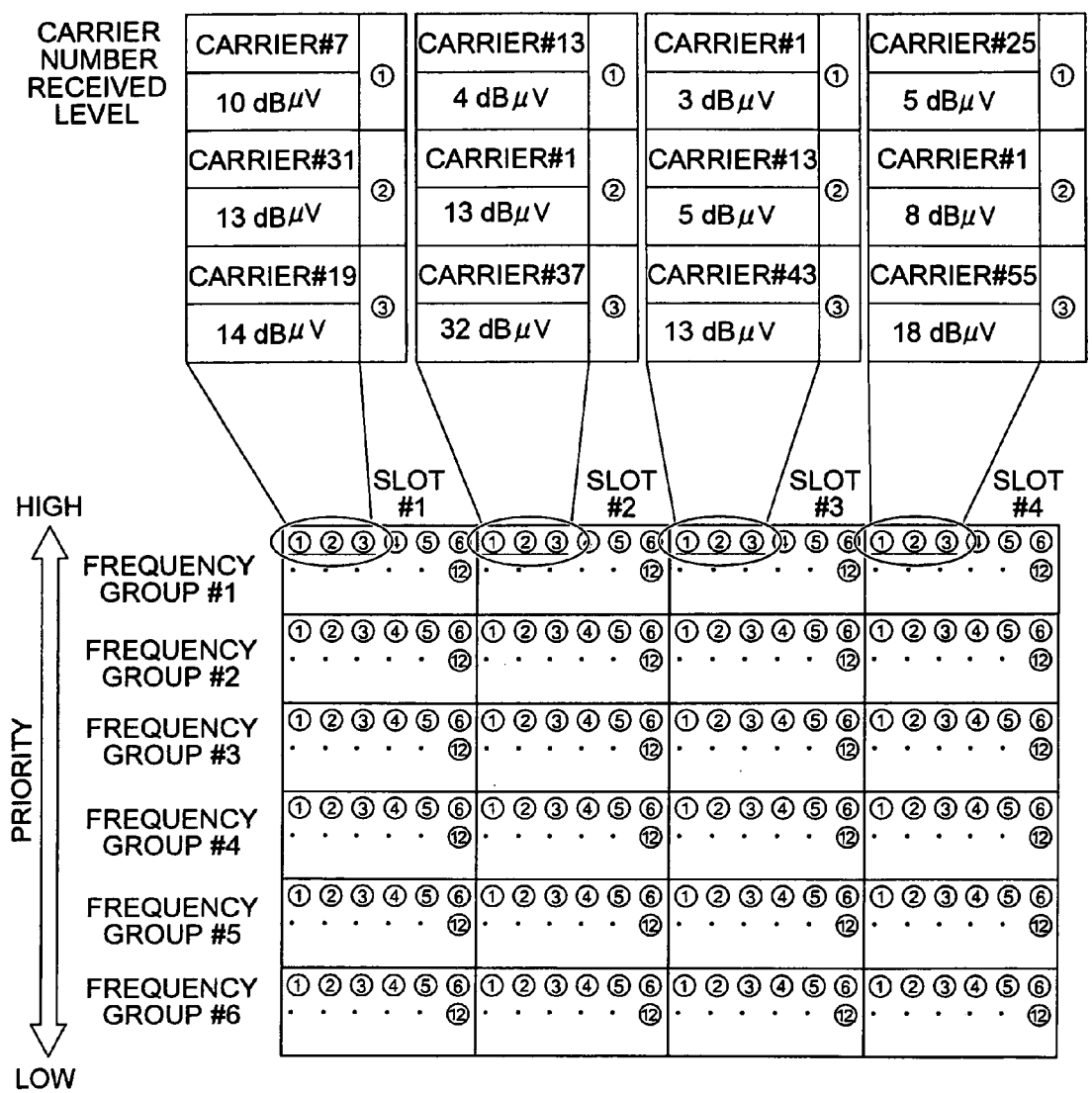
FIG. 12 is a diagram of an overview of the process according to the fourth embodiment.

FIG. 12 is a diagram of an overview of the processes at steps S51, S52, and S53. As an example, the base station 2 compares the received levels at up to three carriers from the head of a frequency group set (but the number of carriers to be compared is not limited to three) with a set carrier sense level (e.g., 10 dBμV) in each slot, and selects the slot #3 and the slot #4 as slots each having the maximum number of carriers at which the received level is below the set carrier sense level. And then, the base station 2 decides the slot #4 which has the largest slot number, as a slot to be assigned.

At step S27, the slot with the largest slot number is decided as a slot to be assigned, but the slot to be assigned can be decided with other method. For example, any slot with a smallest slot number may be decided as a slot to be assigned, or either one of slots randomly selected may be decided as a slot to be assigned. Instead, a slot in which the measurement time of the received level is the latest may be decided as a slot to be assigned.

In the fourth embodiment, as explained above, when a slot to be assigned that satisfies desired quality is to be decided, the number of carriers at which the received level is below the set carrier sense level is obtained in each slot, using the received levels at the carriers in the frequency group set. And then, a slot to be assigned is decided based on the numbers of carriers obtained. Thus, it is possible to assign a slot with higher reliability in addition to the effects according to the first embodiment and the second embodiment.

A channel assignment method according to a fifth embodiment of the present invention is explained below.

Figure 13:
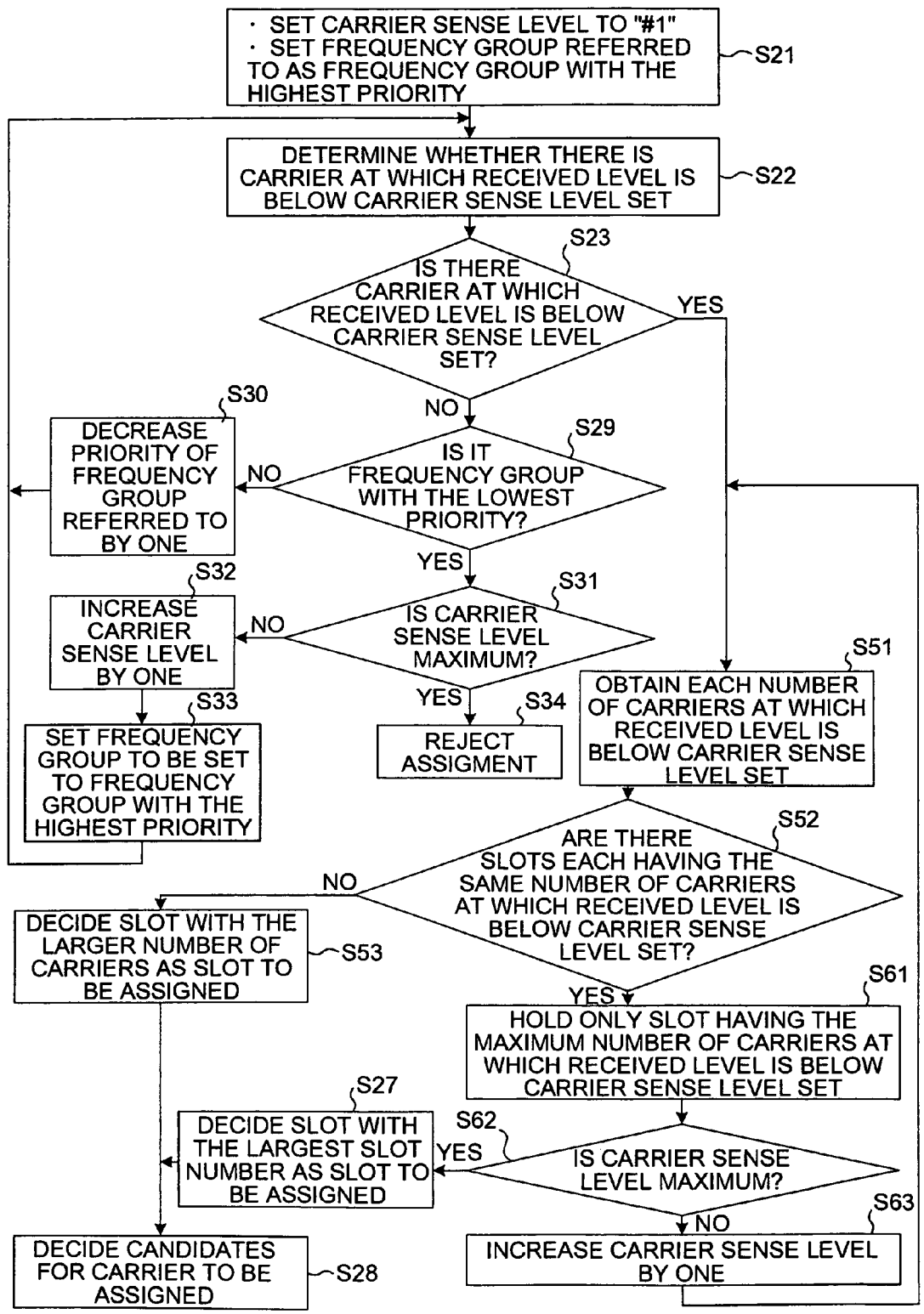
FIG. 13 is a flowchart of a process of deciding a slot to be assigned according to a fifth embodiment of the present invention.

FIG. 13 is a flowchart of a specific example of the process at step S12 according to the first embodiment, i.e., the process of deciding a slot to be assigned using the frequency management tables. It is noted that processes the same as these of the second embodiment, the third embodiment, or the fourth embodiment are assigned the same step numbers, and explanation thereof is omitted. Only the processes different from the second, the third, or the fourth embodiment are explained below.

If each of the slots has the same number of carriers obtained at step S51 (step S52, Yes), the base station 2 stores all the slots each having the maximum number of carriers at which the received level is below the set carrier sense level (step S61). If the current carrier sense level set is the maximum (step S62, Yes), the base station 2 decides a slot with the largest slot number as a slot to be assigned (step S27). On the other hand, if the current carrier sense level set is not the maximum (step S62, No), the base station 2 increases the set carrier sense level (step S63), and performs again the process at step S51.

Figure 14:
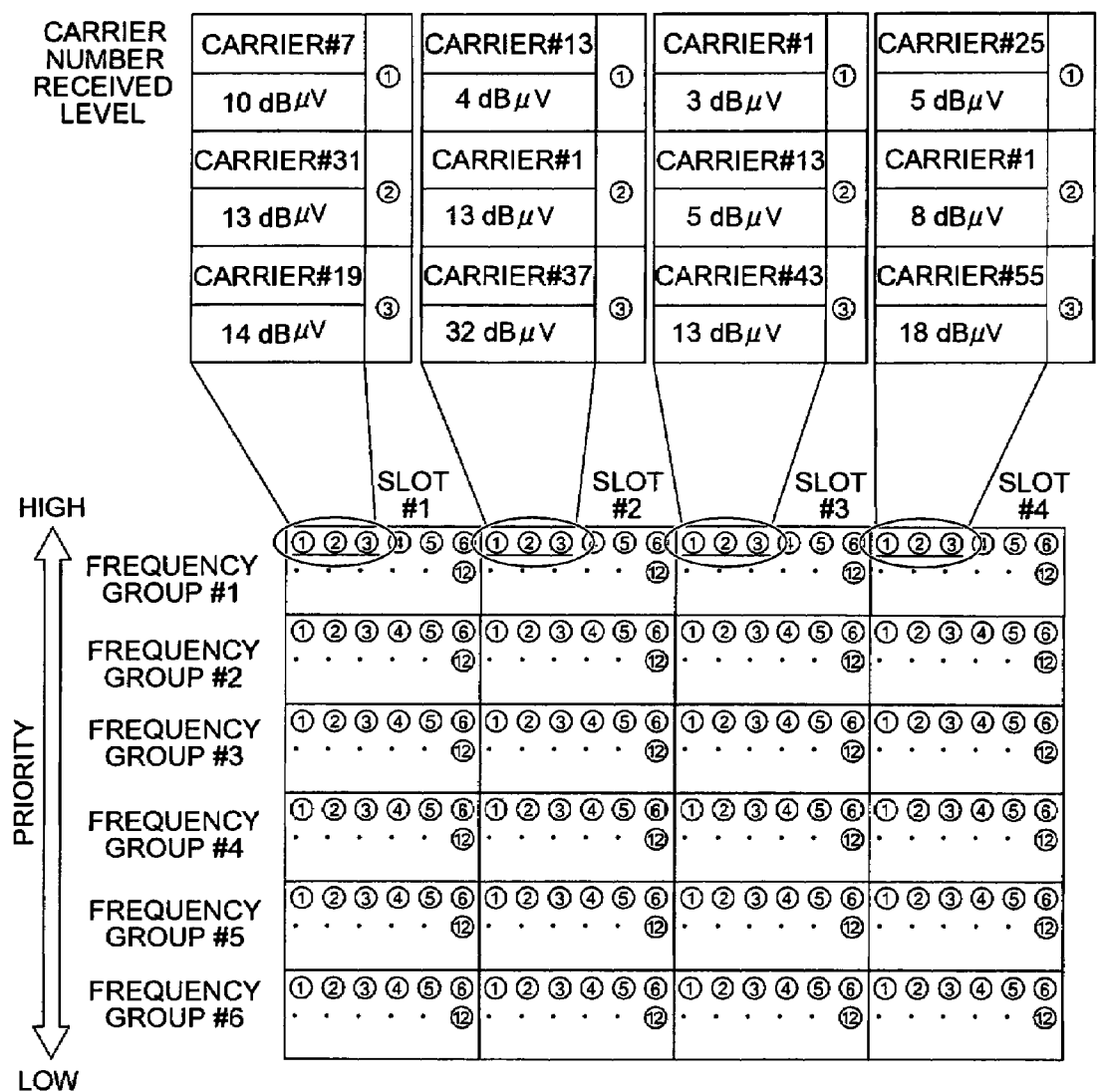
FIG. 14 is a diagram of an overview of the process according to the fifth embodiment.

FIG. 14 is a diagram of an overview of the processes at steps S51, S52, S61, S62, and S63. As an example, the base station 2 compares the received levels at up to three carriers from the head of a frequency group set (but the number of carriers to be compared is not limited to three) with the set carrier sense level (e.g., 10 dBμV) in each of the slots (#1, #2, #3, and #4), and selects the slots #3 and #4 as slots each having the maximum number of carriers at which the received level is below the set carrier sense level. Moreover, the base station 2 compares the received levels at up to three carriers from the head of the frequency group set (but the number of carriers to be compared is not limited to three) with a set carrier sense level (e.g., 15 dBμV) for each of the slots selected (#3 and #4), and decides the slot #3 having the maximum number of carriers at which the received level is below the set carrier sense level, as a slot to be assigned.

In the fifth embodiment, as explained above, when a slot to be assigned that satisfies desired quality is to be decided, the number of carriers at which the received level is below the set carrier sense level is obtained in each slot, using the received levels at the carriers in the frequency group set and a slot to be assigned is decided based on the numbers of carriers obtained. When there are slots each having the same number of carriers, the set carrier sense level is further increased stepwisely, and the number of carriers at which the received level is below the set carrier sense level is obtained until the set carrier sense level becomes the maximum, or until no slots having the same number of carriers are present. Thus, it is possible to assign a slot with higher reliability than that in the radio channel assignment method according to the fourth embodiment, in addition to the effects according to the first embodiment and the second embodiment.

A channel assignment method according to a sixth embodiment of the present invention is explained below.

Figure 15:
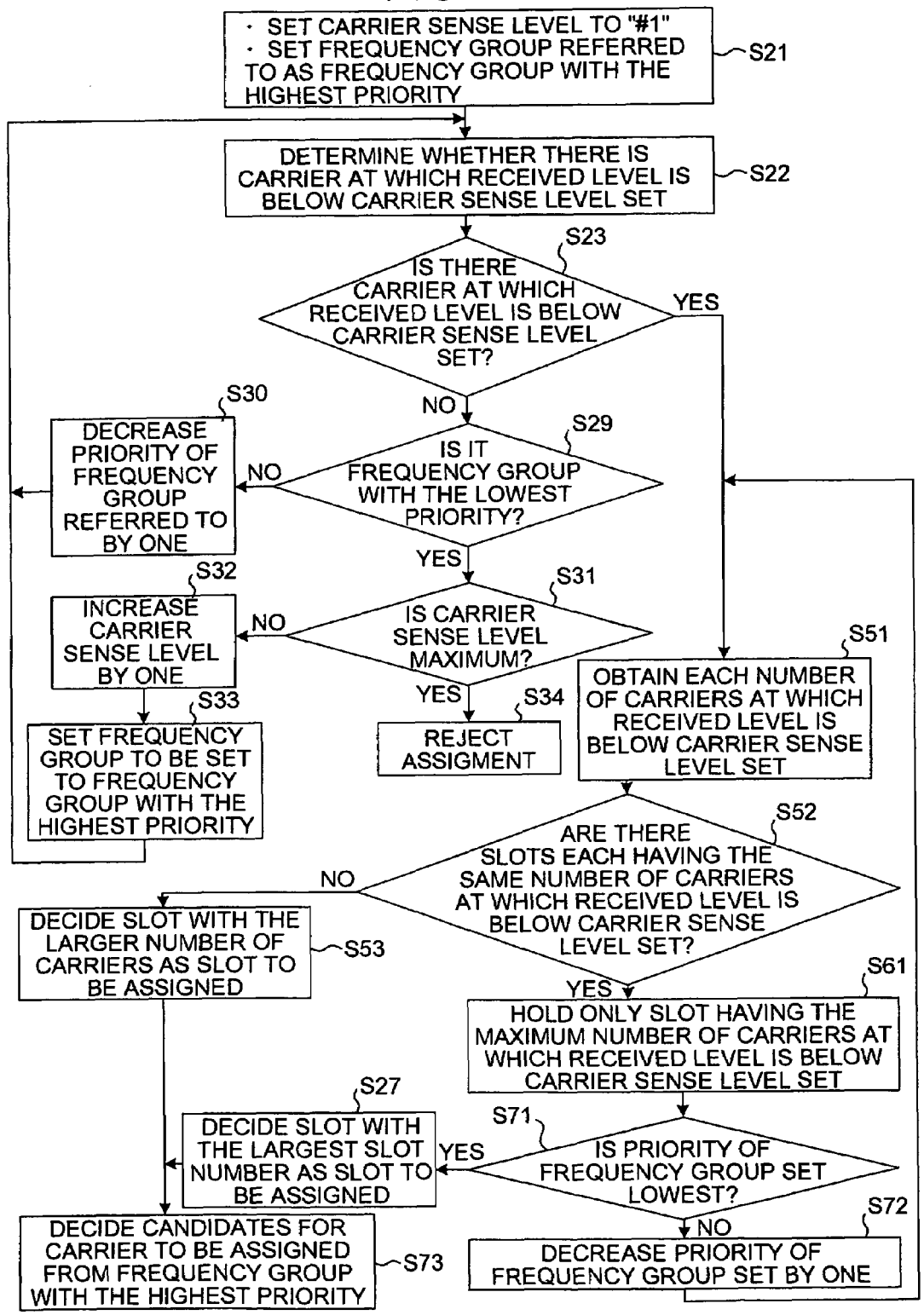
FIG. 15 is a flowchart of a process of deciding a slot to be assigned according to a sixth embodiment of the present invention.

FIG. 15 is a flowchart of a specific example of the process at step S12 according to the first embodiment, i.e., the process of deciding a slot to be assigned using the frequency management tables. It is noted that processes the same as these of the second embodiment, the third embodiment, the fourth embodiment, or the fifth embodiment are assigned the same step numbers, and explanation thereof is omitted. Only the processes different from the second, the third, the fourth, or the fifth embodiment are explained below.

If each of the slots has the same number of carriers obtained at step S51 (step S52, Yes), the base station 2 stores all the slots each having the maximum number of carriers at which the received level is below the set carrier sense level (step S61). If the priority of the current frequency group set is lowest (step S71, Yes), the base station 2 decides a slot with the largest slot number as a slot to be assigned (step S27). On the other hand, if the priority of the current frequency group set is not the lowest (step S71, No), the base station 2 decreases the priority of the frequency group set (step S72), and performs again the process at step S51.

When a slot to be assigned is decided at step S53 and step S27, the base station 2 decides candidates for a carrier to be assigned from a frequency group with the highest priority in the slot to be assigned (step S73).

Figure 16:
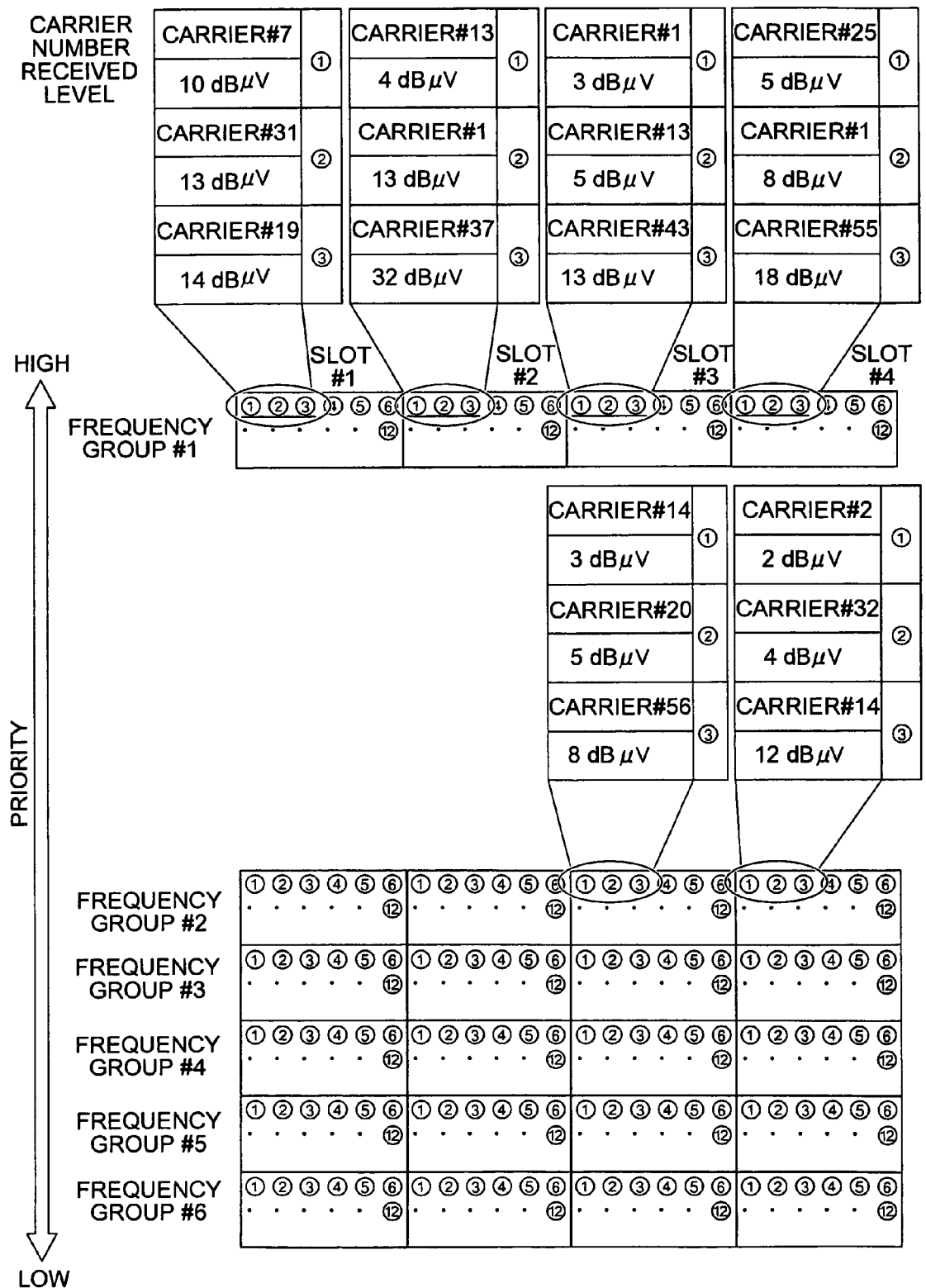
FIG. 16 is a diagram of an overview of the process according to the sixth embodiment.

FIG. 16 is a diagram of an overview of the processes at steps S51, S52, S61, S71, and S73. As an example, the base station 2 compares the received levels at up to three carriers from the head of a frequency group set (but the number of carriers to be compared is not limited to three) with a set carrier sense level (e.g., 10 dBμV) for each of the slots (#1, #2, #3, and #4), and selects the slots #3 and #4 as slots each having the maximum number of carriers at which the received level is below the set carrier sense level. Furthermore, the base station 2 decreases the priority in the frequency groups, compares the received levels at up to three carriers from the head of the frequency group set (but the number of carriers to be compared is not limited to three) with a set carrier sense level (e.g., 10 dBμV) for each of the slots selected (#3 and #4), and decides the slot #3 having the maximum number of carriers at which the received level is below the set carrier sense level, as a slot to be assigned.

In the sixth embodiment, as explained above, when a slot to be assigned that satisfies desired quality is to be decided, the number of carriers at which the received level is below a set carrier sense level is obtained in each slot, using the received levels at a plurality of carriers in a frequency group set, and a slot to be assigned is decided based on the numbers of carriers obtained. If two or more slots have the same number of carriers, the priority of the frequency group set is further decreased stepwisely, and the number of carriers at which the received level is below a set carrier sense level is obtained until the priority of the frequency group set becomes the lowest, or until no slots each having the same number of carriers are present. Thus, it is possible to assign a slot with higher reliability than that in the radio channel assignment method according to the fourth embodiment, in addition to the effects according to the first embodiment and the second embodiment.

A channel assignment method according to a seventh embodiment of the present invention is explained below.

Figure 17:
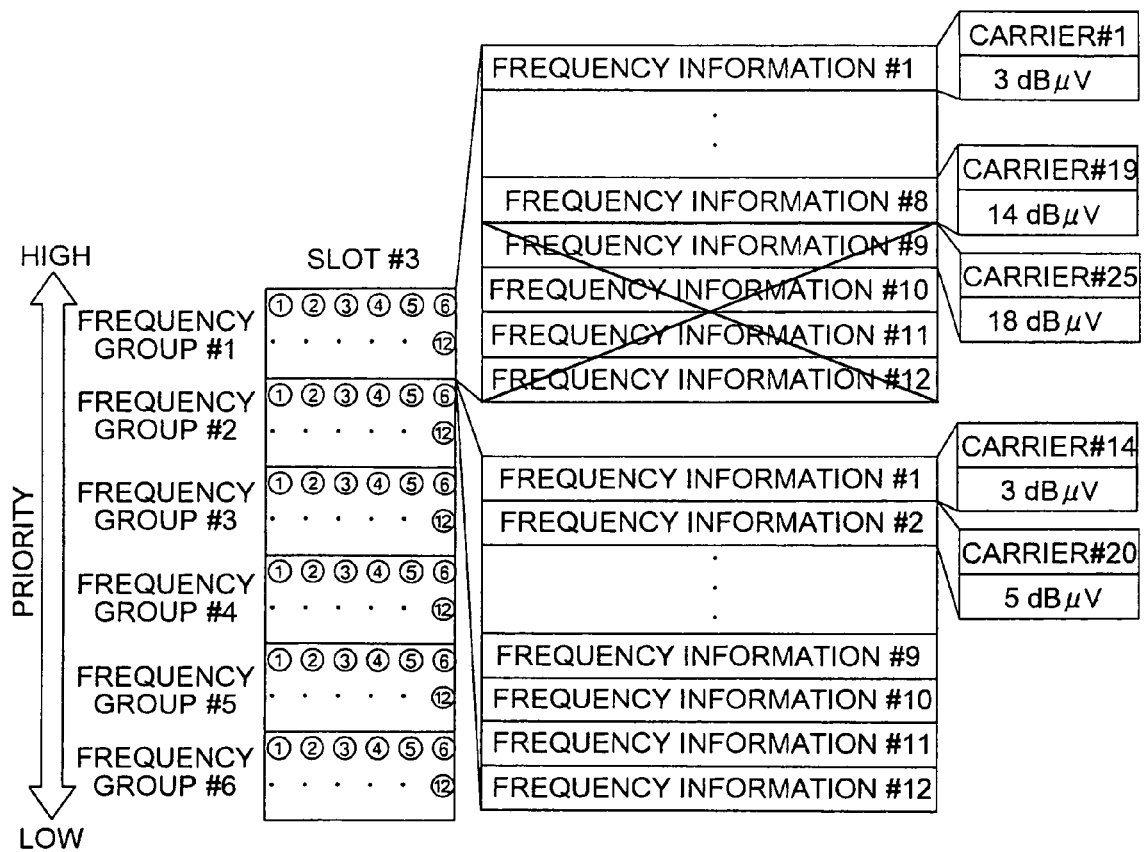
FIG. 17 is a diagram of a process of deciding candidates for a carrier to be assigned according to a seventh embodiment of the present invention.

FIG. 17 is a diagram of a specific example of the processes at step S28 or step S73 according to the second embodiment to the sixth embodiment, i.e., the processes of deciding candidates for a carrier to be assigned using the frequency management tables. The detailed processes at step S28 and step S73 are explained below.

In the seventh embodiment, as an example, a method of deciding the slot #3 as a slot to be assigned and selecting 10 candidates for a carrier to be assigned from the frequency group #1 is explained below. As a reference for selection of candidates for a carrier to be assigned, a threshold level used to select candidates for a carrier to be assigned is provided. In FIG. 17, as an example, the threshold level is set to 15 dBμV.

At first, the base station 2 selects 10 carriers from the head of the frequency group #1 (the frequency group #1 in the slot #3 decided through the processes according to the second embodiment to the sixth embodiment), and determines whether the carriers have the received levels less than the threshold level. At this time, if all the carriers as determination targets have the received levels less than the threshold value, the base station 2 decides the 10 carriers as the candidates for a carrier to be assigned. As shown in FIG. 17, however, if two carriers have the received levels not less than the threshold level, the base station 2 selects eight candidates for a carrier to be assigned, from the frequency group #1, and selects remaining two carriers from a frequency group #2 and thereafter.

The base station 2 selects two carriers from the head of the frequency group #2 and determines, in the same manner as explained above, whether the two carriers have the received levels less than the threshold level. Since it is determined that these two carriers have the received levels less than the threshold level, the base station 2 decides the 10 candidates for a carrier to be assigned including the eight carriers decided in the frequency group #1. However, if all the carriers in the frequency group #2 have the received levels not less than the threshold level, then the base station 2 performs the process of determination on a frequency group #3.

The insufficient number of candidates for a carrier to be assigned in the frequency group #1 is covered by the frequency group #2 in FIG. 17, but the way to cover this is not limited thereto. Therefore, if 10 candidates for a carrier to be assigned cannot be decided in the frequency group #1, then, it may be determined whether all the carriers in the frequency group #1 and the frequency group #2 have the received levels less than the threshold level. And then, top 10 carriers may be decided as candidates for a carrier to be assigned.

In the seventh embodiment, as explained above, in the process of deciding candidates for a carrier to be assigned using the frequency management tables, any carrier having the threshold value as a desired value or more in the slot to be assigned that is decided in the second embodiment to the sixth embodiment is excluded from the candidates for a carrier to be assigned. This allows assignment of a highly reliable carrier to a mobile station.

INDUSTRIAL APPLICABILITY

As explained above, the radio channel assignment method according to the present invention is useful for the radio communication system that employs the multicarrier TDMA/TDD, and is particularly suitable as a technology used for the case where a radio base station autonomously performs channel selection/assignment in the radio communication system.

The invention claimed is:

1. A radio channel assignment method of employing a multicarrier TDMA (Time Division Multiple Access) system in which communication is performed using a specific carrier in each transmission/reception slot that is obtained through time division, and of assigning a transmission/reception slot and a carrier, as a radio channel, that satisfy desired quality to each mobile station, comprising:

a table managing step of
  managing a frequency management table that includes groups each having a specific number of carriers that form a radio channel so as to be distributed over wide frequency bands;
  cyclically measuring a received level of interference at the radio channel using an idle slot; and
  holding results of measurement in order from a carrier at which the received level is lowest, by each of the groups in slots;
a radio-channel-candidate deciding step of
  deciding a slot to be assigned and candidates for a carrier to be assigned in the slot to be assigned based on the frequency management table, when assignment of a radio channel is requested (re-request is also included);
a lowest-received-level-carrier selecting step of
  performing a carrier sense on the candidates for a carrier to be assigned in the slot to be assigned; and
  selecting a carrier at which the received level is the lowest, out of the candidates; and
a radio channel deciding step of
  comparing the received level at the carrier selected with a specific threshold value that is used to determine whether interference or interruption occurs; and
  deciding the carrier selected as a carrier to be assigned when the received level is less than the specific threshold value.

2. The radio channel assignment method according to claim 1, wherein the table managing step further includes
  setting individual priorities in the groups in each of base stations that form a system, and
the radio-channel-candidate deciding step further includes
  searching (determining) each group of the slots based on the priorities; and
  deciding a slot to be assigned and candidates for a carrier to be assigned in the slot to be assigned, based on results of search.

3. The radio channel assignment method according to claim 2, wherein as a result of comparison at the radio channel deciding step, if the received level at the carrier selected is not less than the specific threshold value, each group of the slots is searched (determined) again based on the priorities, and the process at the radio-channel-candidate deciding step is performed.

4. The radio channel assignment method according to claim 2, wherein the radio-channel-candidate deciding step further includes
  a setting step of
    setting a carrier sense level that can be set stepwisely, to a predetermined level; and
    setting a group that is initially searched in the frequency management table as a group with the priority that is highest; and
  an assigned-slot deciding step of
    determining, in each slot, whether the received level at a head carrier of carriers assigned to the set group is below the set carrier sense level; and
    if at least one of received levels of interference at head carriers is below the set carrier sense level;
    deciding a slot having a head carrier at which the received level is the lowest, as a slot to be assigned.

5. The radio channel assignment method according to claim 4, wherein as a result of determination at the assigned-slot deciding step, if there is no head carrier at which the received level is below the set carrier sense level, then it is further determined whether the priority of the set group is the lowest, and
  if the priority is not the lowest, then the priority of the set group is decreased, and the processes at the assigned-slot deciding step are performed again.

6. The radio channel assignment method according to claim 5, wherein as a result of determination whether the priority of the set group is the lowest, if the priority is the lowest, then it is further determined whether the set carrier sense level is the maximum,
  if the set carrier sense level is not the maximum, the set carrier sense level is increased, the priority of the set group is set to the highest, and the processes at the assigned-slot deciding step are performed again, and
  if the set carrier sense level is the maximum, then assignment of a slot and a carrier is refused.

7. The radio channel assignment method according to claim 4, wherein if there is a plurality of slots each having a head carrier at which the received level is the lowest,
  the assigned-slot deciding step further includes deciding a slot, of the slots, in which a received-level measurement time is closest to a current time, as a slot to be assigned.

8. The radio channel assignment method according to claim 7, wherein as a result of determination at the assigned-slot deciding step, if there is no head carrier at which the received level is below the set carrier sense level, then it is further determined whether the priority of the set group is the lowest, and if the priority of the set group is not the lowest, the priority of the set group is decreased, and the processes at the assigned-slot deciding step are performed again.

9. The radio channel assignment method according to claim 8, wherein as a result of determination whether the priority of the set group is the lowest, if the priority is the lowest, then it is further determined whether the set carrier sense level is the maximum level, if the set carrier sense level is not the maximum level, the set carrier sense level is increased, the priority of the set group is set to the highest, and the processes at the assigned-slot deciding step are performed again, and if the set carrier sense level is the maximum level, then assignment of a slot and a carrier is refused.

10. The radio channel assignment method according to claim 2, wherein the radio-channel-candidate deciding step further includes a setting step of
setting a carrier sense level that can be set stepwisely, to a predetermined level, and
setting a group that is initially searched in the frequency management table as a group with the priority that is highest, and an assigned-slot deciding step of
determining, in each slot, whether received levels of interference at head carriers of the carriers assigned to the set group are below the set carrier sense level,
if it is determined that at least one of the received levels at the head carriers is below the set carrier sense level, obtaining the number of carriers at which the received level is below the set carrier sense level, in each slot having a head carrier at which the received level is below the set carrier sense level, and
deciding a slot having the number of carriers that is largest, as a slot to be assigned.

11. The radio channel assignment method according to claim 10, wherein as a result of determination at the assigned-slot deciding step, if there is no head carrier at which the received level is below the set carrier sense level, then it is further determined whether the priority of the set group is lowest, and if the priority of the set group is not the lowest, the priority of the set group is decreased, and the processes at the assigned-slot deciding step are performed again.

12. The radio channel assignment method according to claim 11, wherein as a result of determination whether the priority of the set group is the lowest, if the priority is the lowest, then it is further determined whether the set carrier sense level is the maximum, if the set carrier sense level is not the maximum level, the set carrier sense level is increased, the priority of the set group is set to the highest, and the processes at the assigned-slot deciding step are performed again, and if the set carrier sense level is the maximum, then assignment of a slot and a carrier is refused.

13. The radio channel assignment method according to claim 10, wherein as a result of obtaining the number of carriers at which the received level is below the set carrier sense level, if each of the slots has the same number of carriers and if the set carrier sense level is not the maximum, the assigned-slot deciding step further includes
obtaining the number of carriers at which the received level is below a carrier sense level newly set until the carrier sense level is increased stepwisely to the maximum or until there are no slots each having the same number of carriers, and finally,
deciding a slot having the number of carriers that is the largest, as a slot to be assigned.

14. The radio channel assignment method according to claim 13, wherein as a result of determination at the assigned-slot deciding step, if there is no head carrier at which the received level is below the set carrier sense level, then it is further determined whether the priority of the set group is the lowest, and if the priority is not the lowest, the priority of the set group is decreased, and the processes at the assigned-slot deciding step are performed again.

15. The radio channel assignment method according to claim 14, wherein as a result of determination whether the priority of the set group is the lowest, if the priority is the lowest, then it is further determined whether the set carrier sense level is the maximum level, if the set carrier sense level is not the maximum level, the set carrier sense level is increased, the priority of the set group is set to the highest, and the processes at the assigned-slot deciding step are performed again, and if the set carrier sense level is the maximum level, then assignment of a slot and a carrier is refused.

16. The radio channel assignment method according to claim 10, wherein as a result of obtaining the number of carriers at which the received level is below the set carrier sense level, if each of the slots has the same number of carriers, and if the priority of the set group is not the lowest, the assigned-slot deciding step further includes
obtaining the number of carriers at which the received level is below the carrier sense level until the priority of the set group is decreased stepwisely to the lowest or until there are no slots each having the same number of carriers, and finally,
deciding a slot having the number of carriers that is the largest, as a slot to be assigned.

17. The radio channel assignment method according to claim 16, wherein as a result of determination at the assigned-slot deciding step, if there is no head carrier at which the received level is below the set carrier sense level, then it is further determined whether the priority of the set group is the lowest, and if the priority of the set group is not the lowest, the priority of the set group is decreased, and the processes at the assigned-slot deciding step are performed again.

18. The radio channel assignment method according to claim 17, wherein as a result of determination whether the priority of the set group is the lowest, if the priority is the lowest, then it is further determined whether the set carrier sense level is the maximum level, if the set carrier sense level is not the maximum level, the set carrier sense level is increased, the priority of the set group is set to the highest, and the processes at the assigned-slot deciding step are performed again, and if the set carrier sense level is the maximum level, then assignment of a slot and a carrier is refused.

19. The radio channel assignment method according to claim 2, wherein the radio-channel-candidate deciding step further includes selecting a predetermined number of carriers from a head of a group of which priority is highest in the slot to be assigned, determining whether received levels of interference at the carriers are less than a threshold level that is used to determine whether the carriers can be candidates for the carrier to be assigned, and if the received levels at all the carriers as determination targets are less than the threshold level, deciding the carriers as candidates for the carrier to be assigned.

20. The radio channel assignment method according to claim 19, wherein as a result of determination whether the received level is less than the threshold level, if there is a carrier determined as the carrier at which the received level is not less than the threshold level, it is determined whether the received levels at carriers that form each of the groups are less than the threshold level, until the number of candidates for the carrier to be assigned reaches the predetermined number while decreasing the priority of the group.

* * * * *